(No Model.)

W. G. BOUGHTON.
THILL COUPLING.

No. 358,535. Patented Mar. 1, 1887.

Witnesses.
C. H. Walker
G. H. Thompson

Inventor.
Wm. G. Boughton

N. PETERS, Photo-Lithographer, Washington, D. C.

UNITED STATES PATENT OFFICE.

WILLIAM G. BOUGHTON, OF FROSTBURG, MARYLAND.

THILL-COUPLING.

SPECIFICATION forming part of Letters Patent No. 358,535, dated March 1, 1887.

Application filed July 3, 1886. Serial No. 207,124. (No model.)

*To all whom it may concern:*

Be it known that I, WILLIAM G. BOUGHTON, a citizen of the United States, residing at Frostburg, in the county of Allegany and State of Maryland, have invented a new and useful Improvement in Carriage-Shaft Couplings, of which the following is a specification.

My invention relates to those couplings by means of which shafts are hitched to the axles of carriages and wagons; and the object of the invention is, first, to construct a shaft-coupling which will not rattle when the vehicle is in motion, and, second, to combine with a coupling a shaft-support which will hold the shafts in a vertical position when the vehicle is not in use, thereby protecting it from the danger of being tramped and broken or occupying unnecessary room when housed. I accomplish these objects in the mechanism shown in the accompanying drawings, in which—

Figure 1:
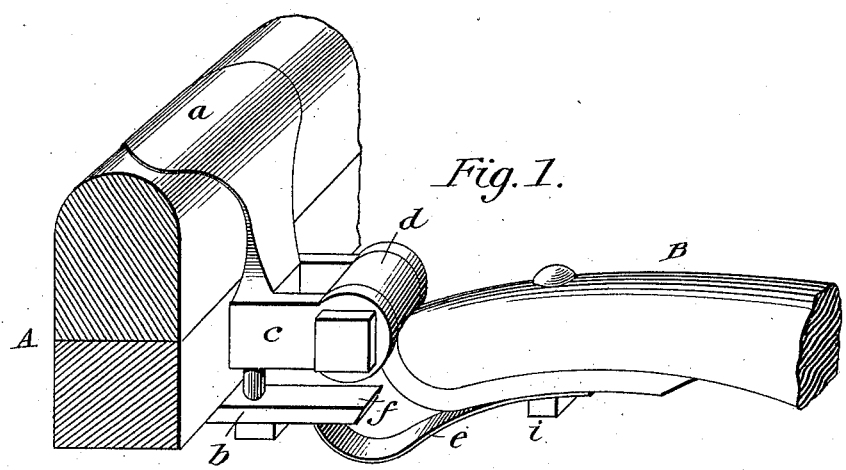
Figure 2:
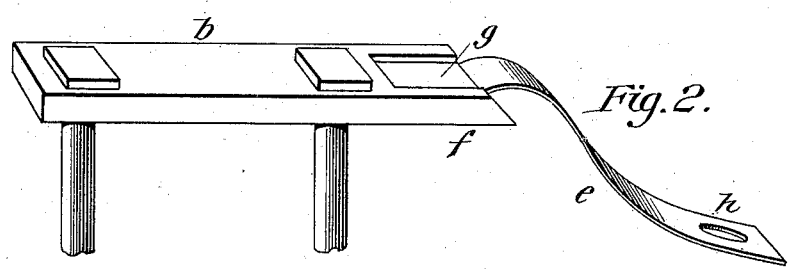
Figure 3:

A, Figure 1, represents a side view of a section of an axle and stock with the clip *a*, yoke *b*, and coupling-ears *c;* and B a side view of a section of the rear end of a shaft with the eye *d* and spring *e*. *b*, Fig. 2, shows the bottom side of the yoke *b* with the recess *g* upon the extended end *f*, in which the curved end of the spring *e* slides. Fig. 3 represents a side view of a shaft when in a vertical position, and shows the application of the invention as a shaft-supporter.

Similar letters refer to similar parts in all of the several views.

When the vehicle is in motion and the shafts are in a horizontal position, the curved end of the spring *e* rests in the recess *g* on the extended end *f* of the yoke *b*, and in this position draws the eye *d* of the shaft downward against the bolt which passes through the eye. Here it is held firmly, and is prevented from jolting upon the bolt or sliding laterally. By this means the clashing of the parts is avoided, and the disagreeable rattling so common in the ordinary coupling effectually dispensed with.

When the shafts are swung upward into a vertical position, Fig. 3, the curved end of the spring *e* moves out of the recess *g* upon the end of the yoke, where it resists the downward movement of the shafts and becomes a support for them in this position. They can be easily moved forward, however, with the pressure of the hand until the spring again assumes its place in the recess of the yoke, where it continues its office of keeping the parts noiseless.

The yoke *b* differs from the ordinary axle-yoke only in having its front end extended and containing the recess *g* in its bottom side. This recess may be made sufficiently deep to form a guide for the end of the spring, and sufficiently long for it to slide in when the shafts are moved upward and downward. The spring is made strong enough for the work specified, and its curved end is made to a shape and width to fit to the recess in the yoke, while its straight end is supplied with the slot *h*, which is made long, so that the spring can be used in a shorter or longer space between the bolt *i*, which fastens it to the shaft and the axle-yoke.

What I claim is—

In combination, the spring *e*, attached to the rear end of a carriage-shaft, with the axle-yoke *b*, having an extended front end, *f*, said end *f* having a recess in its bottom side for the reception of the end of said spring, substantially as described.

WILLIAM G. BOUGHTON.

Witnesses:
 G. H. THOMPSON,
 WM. THOMAS.